United States Patent
Smythe et al.

(10) Patent No.: US 7,130,118 B2
(45) Date of Patent: Oct. 31, 2006

(54) DYNAMIC PROJECTION SCREEN

(75) Inventors: Rachel Fillmore Smythe, Corvallis, OR (US); John A. Devos, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 176 days.

(21) Appl. No.: 10/913,917

(22) Filed: Aug. 6, 2004

(65) Prior Publication Data

US 2006/0028721 A1    Feb. 9, 2006

(51) Int. Cl.
*G03B 21/60*  (2006.01)
*C09K 19/00*  (2006.01)
*G02F 1/03*   (2006.01)
*G03C 8/00*   (2006.01)
*G03C 5/00*   (2006.01)

(52) U.S. Cl. .............. 359/443; 359/450; 359/459; 430/20; 430/962; 430/199; 430/356

(58) Field of Classification Search ............... 359/443, 359/450, 459; 430/20, 962, 199, 356
See application file for complete search history.

(56) References Cited

U.S. PATENT DOCUMENTS 6,221,543 B1 *   4/2001   Guehler et al. ............. 430/7

* cited by examiner

*Primary Examiner*—W. B. Perkey
*Assistant Examiner*—Magda Cruz

(57) ABSTRACT

An enhanced-contrast projection screen and method of controlling such screens are disclosed. An embodiment of a dynamic projection screen includes a passive layer and at least one active layer. The active layer is superimposed on at least a portion of the passive layer and is adapted to selectively toggle between being transparent and being opaque. A method of controlling such a screen includes determining desired dimensions of a reflective region, and activating at least a portion of an active layer superimposed on at least a portion of a passive layer. The active layer is adapted to selectively toggle between being transparent and opaque.

25 Claims, 5 Drawing Sheets

DYNAMIC PROJECTION SCREEN

BACKGROUND OF THE INVENTION

The present invention relates generally to the field of screens for reflecting a projected image. In particular, the invention relates to a dynamic screen adapted to improve contrast for a plurality of projected image dimensions.

Projection screens can be used to reflect a variety of projected images. To improve the image quality, screens often include a reflective region surrounded by a light-absorbing border, such as a black material, to enhance the contrast between the projected image and ambient or secondary light.

However, such screens cannot accommodate projected images of different dimensions. For example, the screen may be used to reflect a 3×4 television image at one time, and the same screen may be used to reflect a 9×16 widescreen projected image at another time. The same border cannot effectively enhance contrast in both cases.

SUMMARY OF THE INVENTION

One embodiment of the invention relates to a dynamic projection screen. The projection screen includes a passive layer and at least one active layer. The active layer is superimposed on at least a portion of the passive layer and is adapted to selectively toggle between being transparent and being opaque. In certain embodiments, the active layer is adapted to selectively toggle between being light-reflecting and light-absorbing.

Another embodiment of the invention relates to a method of controlling a dynamic projection screen. The method includes determining desired dimensions of a reflective region, and activating at least a portion of an active layer superimposed on at least a portion of a passive layer. The active layer is adapted to selectively toggle between being transparent and opaque. In certain embodiments, the active layer is adapted to selectively toggle between being light-reflecting and light-absorbing.

It is to be understood that both the foregoing general description and the following detailed description are exemplary and exemplary only, and are not restrictive of the invention as claimed.

DETAILED DESCRIPTION OF CERTAIN EMBODIMENTS

Figure 1:
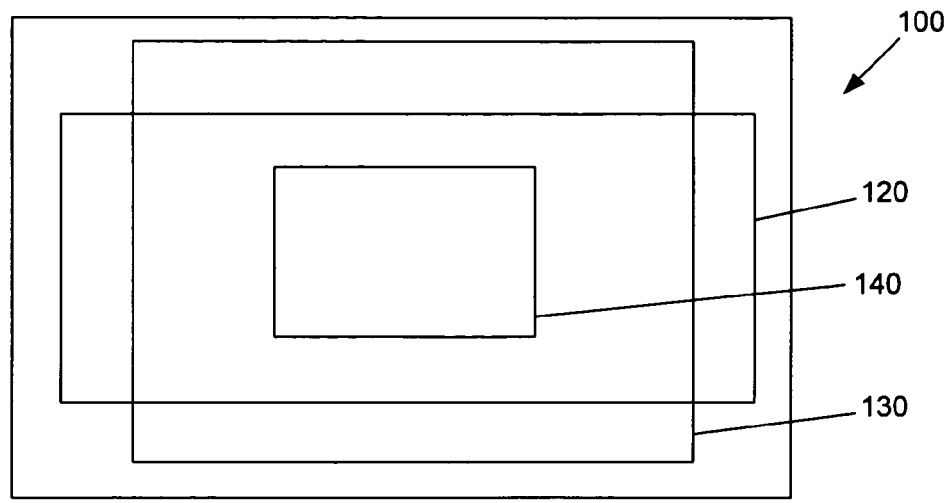
FIG. 1 is a front view of an embodiment of a projection screen.

Referring to FIG. 1, an embodiment of a projection screen is illustrated. The projection screen 100 is dimensioned to accommodate a variety of projected image sizes. The screen may be of any practical size selected for the viewing environment. For example, a small size may be appropriate for a small room, while a larger size may be appropriate for a large conference room, for example.

Images of a variety of sizes and dimensions may be projected onto the projection screen 100. Certain exemplary image sizes are illustrated in FIG. 1. A wide-screen image having a 16:9 aspect ratio, as may be desirable for a movie theater experience, may be projected onto a wide-screen image region 120. Similarly, for television images, an image having a 4:3 aspect ratio may be projected on a large television-image region 130, while a smaller image having the same aspect ratio may be projected onto a small television-image region 140. Of course, an image of any other size or dimension within the limitations of the size of the screen 100 can also be accommodated.

The projection screen 100 adapts to the varying image sizes to enhance contrast between the projected image and ambient or secondary light in areas surrounding the image. The projection screen 100 provides for reflectivity of light in the areas of the screen 100 having a projected image, while providing for absorption of light in other areas. Thus, as illustrated below with reference to FIGS. 3–6, depending on the size and dimension of the image being projected, the size and dimension of the reflective area of the screen 100 is accordingly varied.

Figure 2:
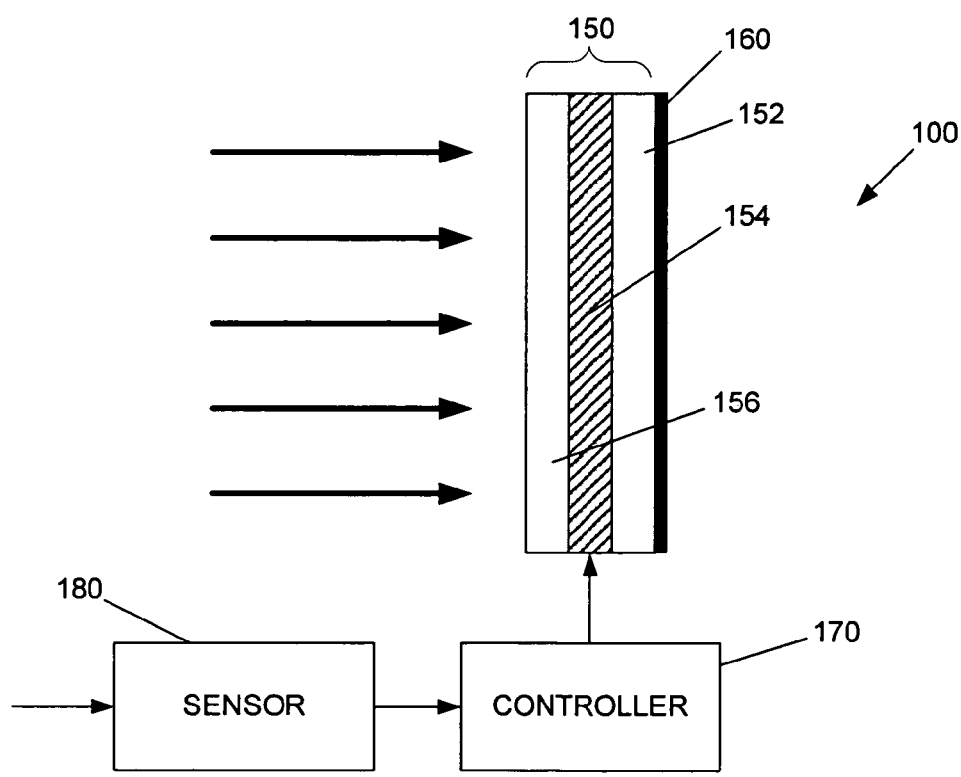
FIG. 2 is a cross-sectional side-view and a schematic illustration of an embodiment of a projection screen.

FIG. 2 illustrates a cross-sectional view of an embodiment of the projection screen 100. An image is projected onto the screen as light from a projector, for example, as indicated by the arrows. The projection screen 100 includes an active layer 150 and a passive layer 160. The active layer 150 includes a layer of variable chromic material 154 sandwiched between two transparent conductive layers 152, 156.

In particular embodiments, the variable chromic material layer 154 may be formed of an electrochromic material or a photochromic material. In one embodiment, the variable chromic material includes polyethylene-dioxythiophene (PEDOT). Other materials, such as liquid crystal or tungsten oxide, may also be used. The thickness of the chromic material layer can be determined based on the particular application. In one embodiment, the chromic material is between 2 and 5 microns.

The conductive layers 152, 156 surrounding the chromic material layer 154 may be formed of a variety of conductive materials. In a particular embodiment, the conductive layers 152, 156 are formed of indium tin oxide having a thickness of between 20 and 50 nanometers.

An active layer 150 is formed on one side of the passive layer 160. The passive layer 160 is an opaque layer that may be formed of any number of materials, such as plastic. In one embodiment, the transparent conductive layer 152 is formed as a coating deposited on the passive layer 160. In other embodiments, the passive layer 160 and the backside conductive layer 152 are integrally formed. In one such embodiment, the backside conductive layer 152 may be opaque and serves the functions of both the conductive layer 152 and the passive layer 160.

The layer of variable chromic material 154 is adapted to be responsive to a voltage differential between the surrounding layers of conductive materials 152, 156. In certain embodiments, based on the voltage differential, the variable chromic material can toggle between light-absorbing and transparent, or between light-reflective and transparent. Thus, in one embodiment, when no voltage differential is applied, the variable chromic material is transparent and turns black when a voltage is applied. The voltage differential may be applied on a region-by-region basis across the screen or, in other embodiments, may be applied on a pixel-by-pixel basis.

In other embodiments, variable chromic material can toggle between light-absorbing and light-reflecting. In such embodiments, the passive layer may be merely a substrate or a backing to support the active layer. Alternatively, the passive layer may provide additional light-reflectivity or light-absorption.

In still other embodiments, the variable chromic material may be bi-stable. In this regard, the variable chromic material may transition from one state to another (e.g., opaque to transparent, light-absorbing to light-reflecting) and vice versa when a voltage differential is applied. Once the material is in a desired state, no voltage differential is required to remain in that state. Thus, the material is stable at both states without a voltage differential being applied.

The voltage differential is applied and controlled by a controller 170. The controller 170 may be a voltage controller including a power source. In other embodiments, the power source may be external to the controller 170.

The controller 170 receives inputs from a sensor 180. The sensor 180 may be adapted to receive infrared (IR) or radio frequency (RF) signals, for example, from an external source. The sensor 180 may also be adapted to receive other types of signals, such as ultraviolet signals, visible light signals and wire signals. Further, the sensor 180 may be adapted to receive a combination of these types of signals. In one embodiment, the sensor 180 is adapted to receive signals from an image source, such as a projector. The signals may indicate the desired image dimensions on the screen 100. In another embodiment, the sensor 180 may include photo-receptors mounted on the screen to detect the desired image dimensions. In particular embodiments, the controller 170 may include multiple controllers, each adapted to control a certain region or aspect of the screen 100. Similarly, in some embodiments, multiple sensors may be used to receive inputs relating to different regions of the screen 100, for example.

Figure 3:
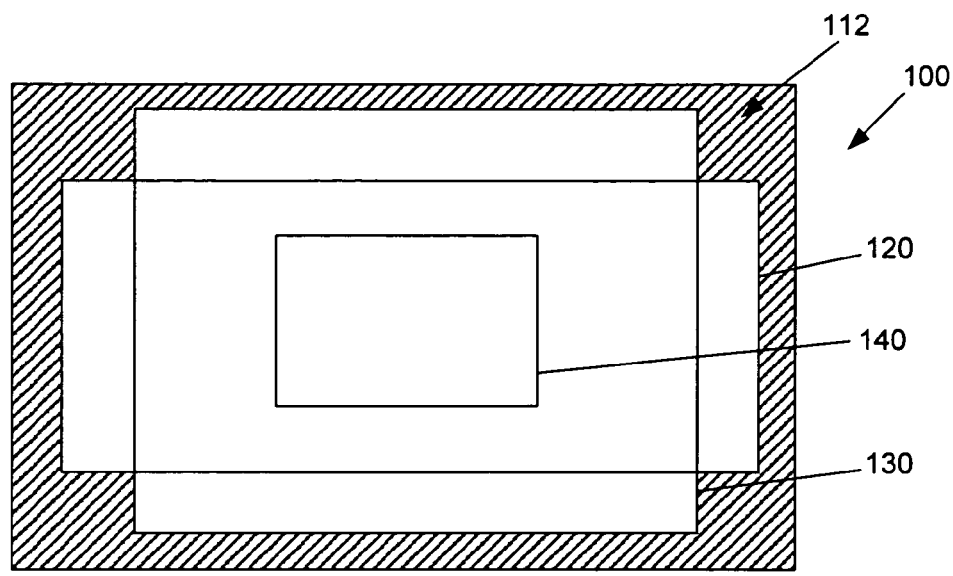
FIG. 3 is a front view of the projection screen of FIG. 1 in an idle state.

FIGS. 3–6 illustrate the screen 100 in various configurations to accommodate varying image sizes. FIG. 3 illustrates the screen 100 in an idle, or inactive, mode. In this mode, a permanent border region 112 may be in a light-absorbing state. In this regard, the permanent border region 112 of the screen 110 may be formed as a black layer without the active layer 150 described above with reference to FIG. 2. Thus, even without any power applied, the permanent border region 112 remains light-absorbing.

The remaining regions of the screen 100 in this mode are indicative of the nature of the passive layer 160 described above with reference to FIG. 2. For example, if the passive layer is light-reflective and the active layer is adapted to toggle between transparent and light-absorbing, the remaining regions of the screen are light-reflective in the idle mode, as illustrated in FIG. 3. If, on the other hand, the passive layer is light-absorbing and the active layer is adapted to toggle between transparent and light-reflective, the remaining regions of the screen are light-absorbing in the idle mode.

Figure 4:
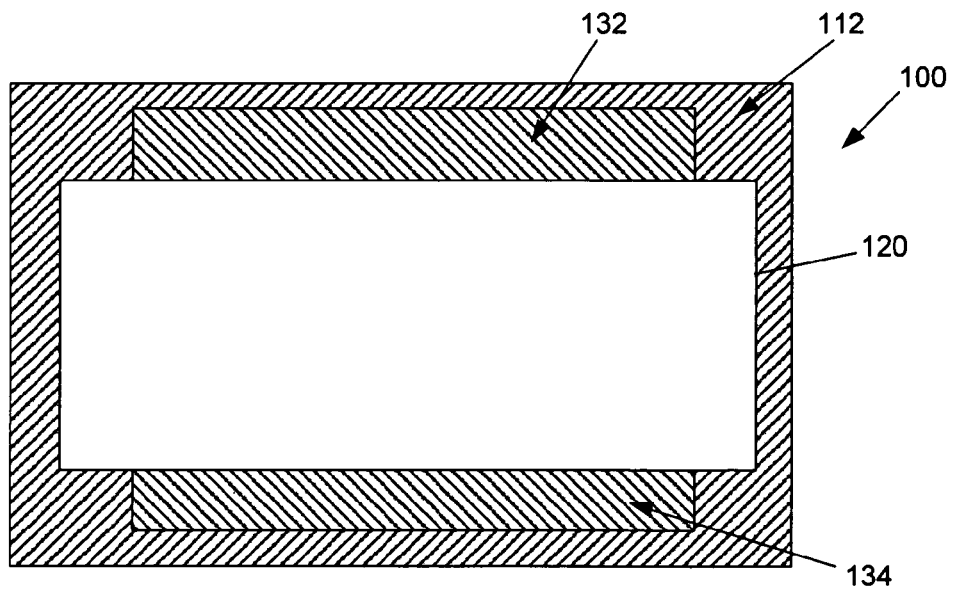
FIG. 4 is a front view of the projection screen of FIG. 1 arranged for an image having wide-screen dimensions.

FIG. 4 illustrates the screen 100 in a wide-screen mode adapted to accommodate a wide-screen image, as may be desired to achieve a theater-style effect. In this state, the wide-screen image region 120 is light-reflective, while the remaining regions of the screen are light-absorbing. In this regard, in addition to the permanent border region 112, top and bottom regions 132, 134 are made light absorbing.

The state of the screen 110 illustrated in FIG. 4 may be achieved by activating the active layer so that only the wide-screen image region 120 is light-reflective. In embodiments having a passive layer that is light-reflective and an active layer adapted to toggle between transparent and light-absorbing, the wide-screen mode may be achieved by activating the active layer in the top and bottom regions 132, 134 to toggle to light-absorbing, while any active layer in the wide-screen image region 120 is toggled to be transparent. On the other hand, in embodiments having a passive layer that is light-absorbing and an active layer adapted to toggle between transparent and light-reflective, the wide-screen mode may be achieved by activating the active layer in the top and bottom regions 132, 134 to toggle to be transparent, while the active layer in the wide-screen image region 120 is toggled to be light-reflective.

Figure 5:
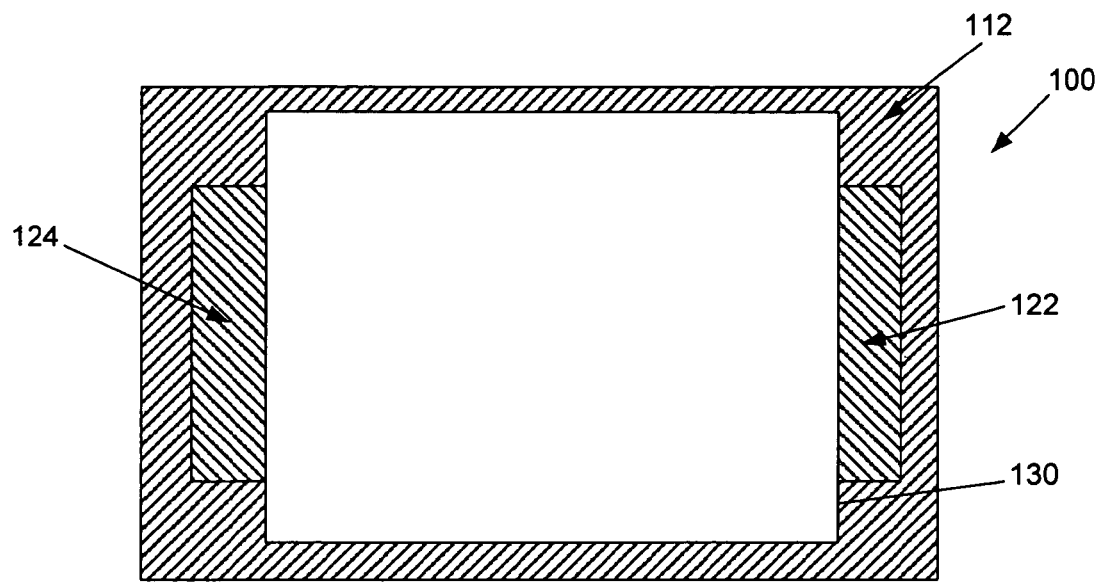
FIG. 5 is a front view of the projection screen of FIG. 1 arranged for an image having large television-screen dimensions.

FIG. 5 illustrates the screen 100 in a large-TV mode adapted to accommodate a large-screen, television-type image. In this mode, the large television-image region 130 is light-reflective, while the remaining regions of the screen are light-absorbing. In this regard, in addition to the permanent border region 112, left and right regions 122, 124 are made light absorbing.

The state of the screen 110 illustrated in FIG. 5 may be achieved by activating the active layer so that only the large television-image region 130 is light-reflective. In embodiments having a passive layer that is light-reflective and an active layer adapted to toggle between transparent and light-absorbing, the large-TV mode may be achieved by activating the active layer in the left and right regions 122, 124 to toggle to light-absorbing, while any active layer in the large television-image region 130 is toggled to be transparent. On the other hand, in embodiments having a passive layer that is light-absorbing and an active layer adapted to toggle between transparent and light-reflective, the large-TV mode may be achieved by activating the active layer in the left and right regions 122, 124 to toggle to be transparent, while the active layer in the large television-image region 130 is toggled to be light-reflective.

Figure 6:
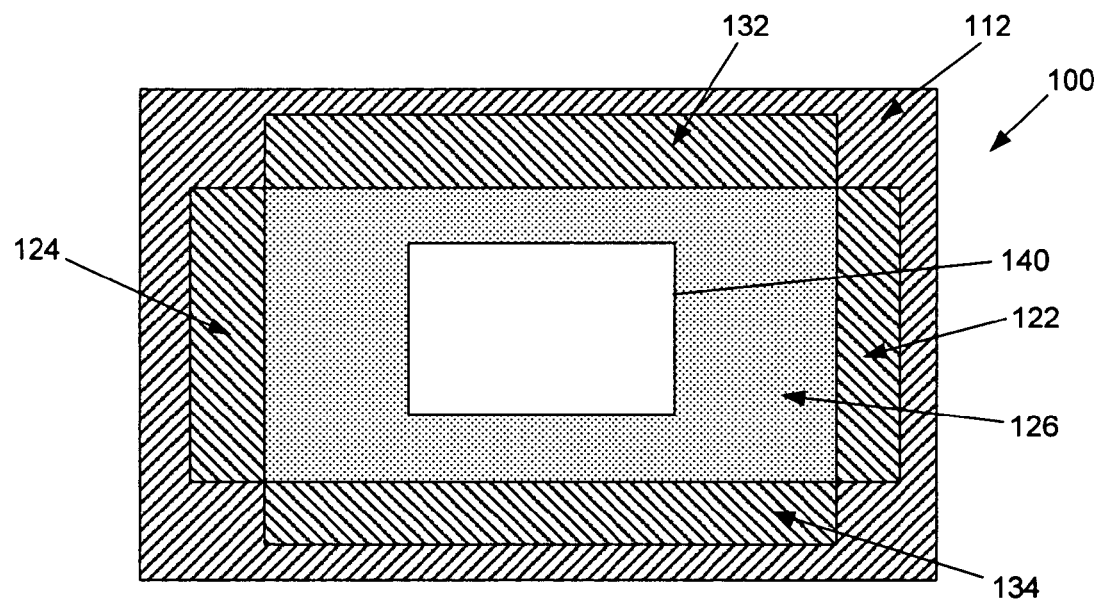
FIG. 6 is a front view of the projection screen of FIG. 1 arranged for an image having small television-screen dimensions.

FIG. 6 illustrates the screen 100 in a small-TV mode adapted to accommodate a small-screen, television-type image. In this mode, the small television-image region 140 is light-reflective, while the remaining regions of the screen are light-absorbing. In this regard, the permanent border region 112, left and right regions 122, 124, top and bottom regions 132, 134, and an internal border region 126 are made light absorbing.

The state of the screen 110 illustrated in FIG. 6 may be achieved by activating the active layer so that only the small television-image region 140 is light-reflective. In embodiments having a passive layer that is light-reflective and an active layer adapted to toggle between transparent and light-absorbing, the small-TV mode may be achieved by activating the active layer in the left and right regions 122, 124, the top and bottom regions 132, 134 and the internal border region 126 to toggle to light-absorbing, while any active layer in the small television-image region 140 is toggled to be transparent. In certain such embodiments, the small television-image region 140 may include only a light-reflective passive layer without any active layer superimposed thereon. In such cases, the small television-image region 140 is always light-reflective, including when the screen 100 is in an idle mode.

In embodiments having a passive layer that is light-absorbing and an active layer adapted to toggle between transparent and light-reflective, the small-TV mode may be achieved by activating the active layer in the left and right regions 122, 124, the top and bottom regions 132, 134 and the internal border region 126 to toggle to be transparent, while the active layer in the small television-screen image region 140 is toggled to be light-reflective.

Figure 7:
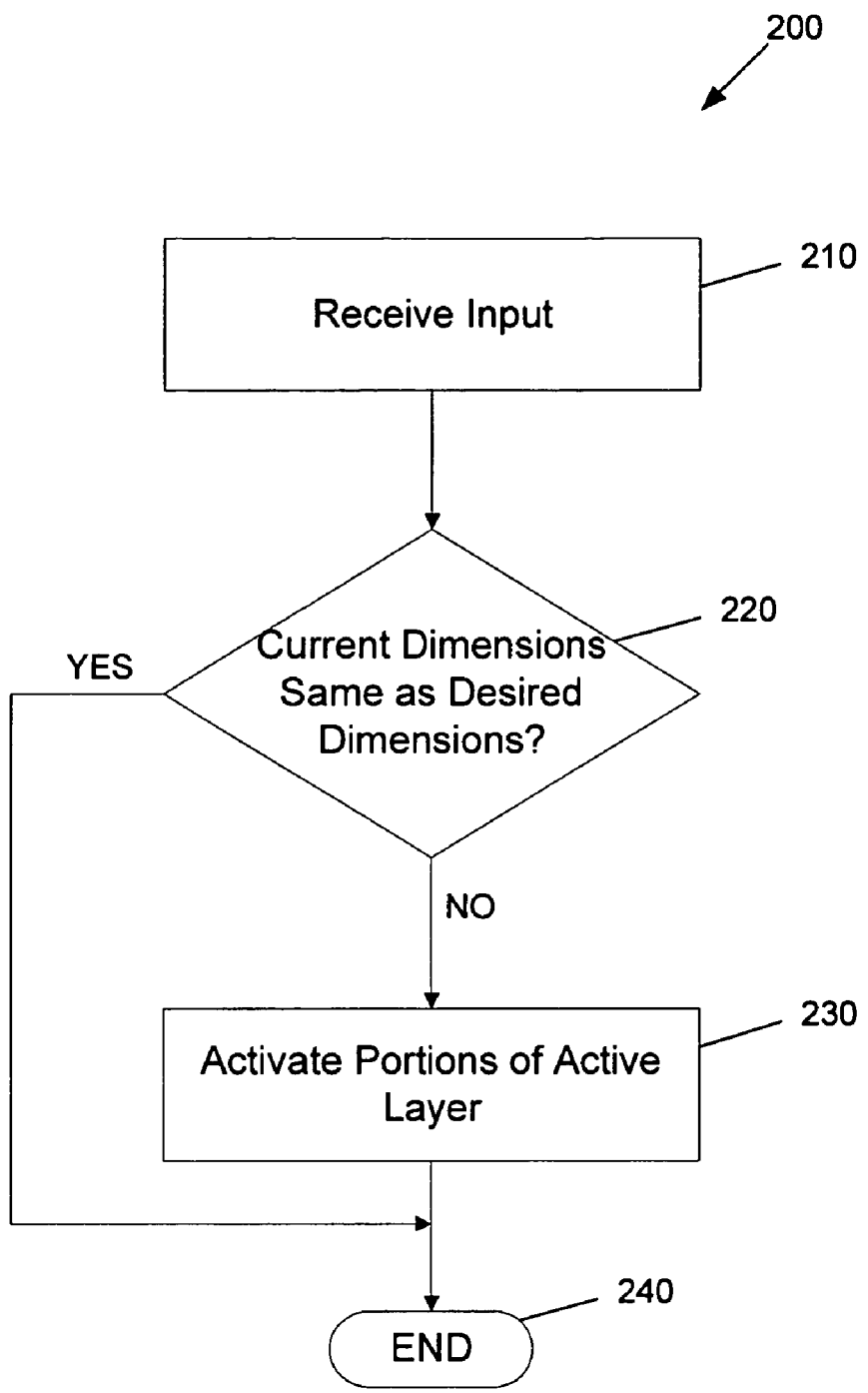
FIG. 7 is a flow chart illustrating a process for controlling a dynamic projection screen.

FIG. 7 is a flow chart illustrating a process for controlling a dynamic projection screen, such as the screen 100 described above with reference to FIGS. 1–6. The control process 200 begins when a controller of the screen, such as the controller 170 of FIG. 2, receives an input (block 210). The input may be in the form of a signal from a device, such as a projector, indicating the dimensions of the image to be reflected by the screen. As noted above, the signals may be received by a sensor as IR or RF signals and provided to the controller. In other embodiments, the input may be provided directly to the controller by a user through, for example, an input device such as a keypad.

Upon receiving the input, the controller may determine whether the dimensions of the image indicated by the received input are the same as the current dimensions of the reflective area of the screen (block 220). For example, in certain cases, an input may be received from a projector indicating a wide-screen image to be projected. The screen is currently in a mode which accommodates a wide-screen image, the controller may determine no action is needed. Otherwise, the process 200 proceeds to block 230, and the controller activates various regions of the active layer to provide a reflective area corresponding to the dimensions indicated by the input.

Although the above description has emphasized embodiments of screens for front projections systems, the inventive concept is applicable to rear-projections systems as well. Exemplary embodiments of rear-projections screens are illustrated in FIGS. 8A and 8B.

Figure 8A:
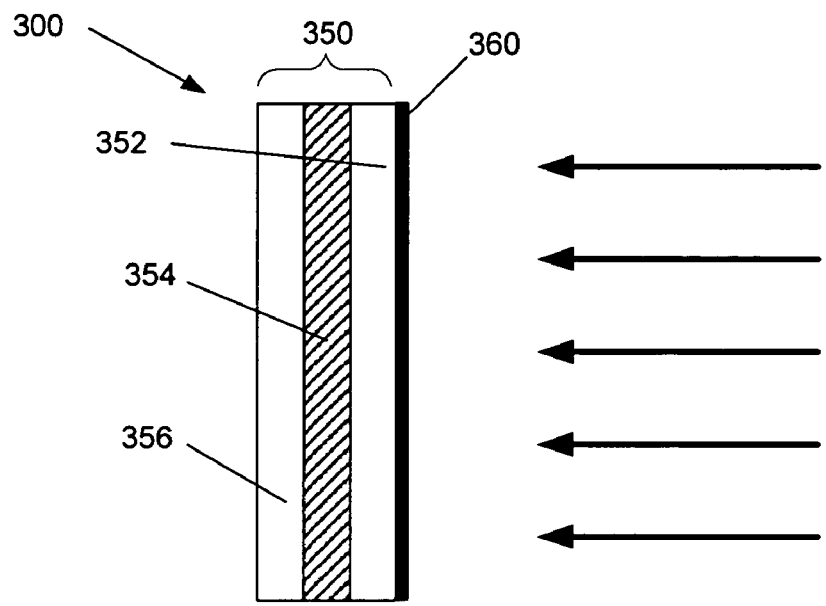
FIGS. 8A and 8B are cross-sectional side-views of additional embodiments of a projection screen.

FIG. 8A illustrates a cross-sectional view of an embodiment of the projection screen 300 adapted for rear-projection systems. An image is projected onto the screen, as indicated by the arrows, with the viewers being on the opposite side from the arrows. The projection screen 300 includes an active layer 350 and a passive layer 360. The active layer 350 includes a layer of variable chromic material 354 sandwiched between two transparent conductive layers 352, 356. The active layer 350 is formed on the front, viewer side, while the passive layer 360 is formed on the rear, projection side. The passive layer 360 is a light transmissive layer, while the active layer 350 can selectively toggle between transparent and light-absorbing.

Figure 8B:
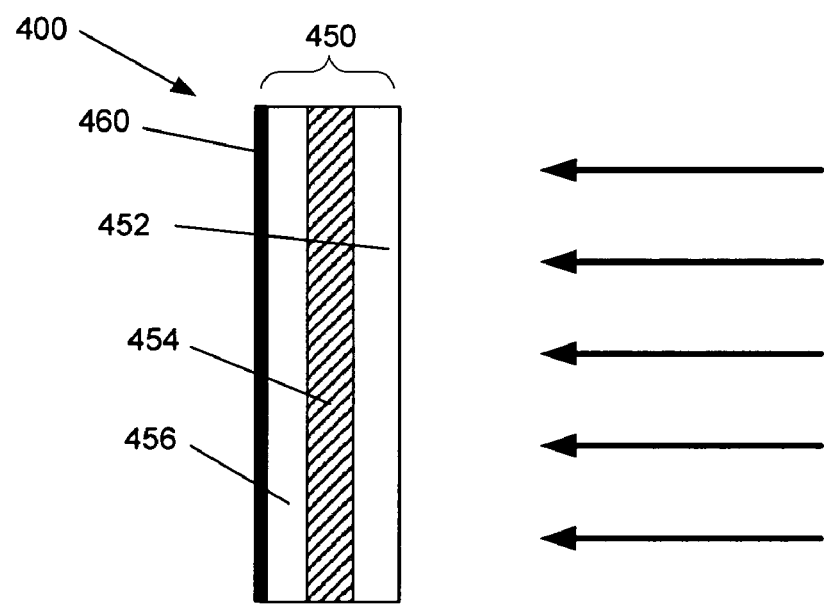

FIG. 8B illustrates a cross-sectional view of another embodiment of the projection screen 400 adapted for rear-projection systems. An image is projected onto the screen, as indicated by the arrows, with the viewers being on the opposite side from the arrows. The projection screen 400 includes an active layer 450 and a passive layer 460. The active layer 450 includes a layer of variable chromic material 454 sandwiched between two transparent conductive layers 452, 456. The active layer 450 is formed on the rear, projector side, while the passive layer 360 is formed on the front, viewer side. The passive layer 360 is a light transmissive layer, while the active layer 350 can selectively toggle between transparent and light-absorbing. In this embodiment, the passive layer 360 offers the additional advantage of protecting the active layer 350 from the external environment.

Thus, the embodiments described above can provide a screen having a reflective surface corresponding to the dimensions of the image projected on the screen. By providing a light-absorbing border region which adapts to the dimensions of the image, contrast between the image and ambient or secondary light is enhanced.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

What is claimed is:

1. A dynamic projection screen, comprising:
a passive layer; and
at least one active layer superimposed on at least a portion of said passive layer; said active layer being adapted to selectively toggle between a first state and a second state and wherein said active layer is transparent in the first state and opaque in the second state.

2. The projection screen according to claim 1, wherein said passive layer is reflective and said active layer is light-absorbing when opaque.

3. The projection screen according to claim 1, wherein said passive layer is light absorbing and said active layer is reflective when opaque.

4. The projection screen according to claim 1 wherein said passive layer is transmissive and said active layer is light-absorbing when opaque.

5. The projection screen according to claim 1, wherein said active layer includes a variable chromic material.

6. The projection screen according to claim 5, wherein said variable chromic material is an electro-chromic material.

7. The projection screen according to claim 5, wherein said variable chromic material is an photo-chromic material.

8. The projection screen according to claim 5, wherein active layer includes a liquid crystal material.

9. A dynamic projection screen, comprising:
a passive layer;
at least one active layer superimposed on at least a portion of said passive layer; said active layer being adapted to selectively toggle between a first state and a second state; and
wherein said active layer is superimposed on one or more regions of said passive layer, said regions being selected to allow a variable reflective screen size.

10. A dynamic projection screen, comprising:
a passive layer;
at least one active layer superimposed on at least a portion of said passive layer; said active layer being adapted to selectively toggle between a first state and a second state; and
at least one controller adapted to activate at least portions of said active layer to form a reflective screen having desired dimensions.

11. The projection screen according to claim 10, wherein said controller is adapted to receive a signal indicative of said desired dimensions.

12. The projection screen according to claim 11, wherein said signal is received as at least one of an infrared signal, an RF signal, an ultraviolet signal, a visible light signal and a wire signal.

13. The projection screen according to claim 10, further comprising:
one or more sensors adapted to determine said desired dimensions.

14. A dynamic projection screen, comprising:
means for reflecting light; and
means for selectively absorbing light being superimposed on at least a portion of said means for reflecting light; said means for selectively absorbing light being adapted to selectively toggle between being transparent and being light-absorbing opaque.

15. A dynamic projection screen, comprising:
means for absorbing light; and
means for selectively reflecting light being superimposed on at least a portion of said means for absorbing light; said means for selectively reflecting light being adapted to selectively toggle between being transparent and being light-reflective opaque.

16. A dynamic projection screen, comprising:
means for transmitting light; and
means for selectively absorbing light being superimposed on at least a portion of said means for transmitting light; said means for selectively absorbing light being adapted to selectively toggle between being transparent and being light-absorbing opaque.

17. A method of controlling a dynamic projection screen, comprising:
determining desired dimensions of a reflective region; and
activating at least a portion of an active layer superimposed on at least a portion of a passive layer; said active layer being adapted to selectively toggle between a first state and a second state; wherein said active layer is adapted to be transparent in the first state and opaque in the second state.

18. The method according to claim 17, wherein said step of activating includes activating a portion of said active layer outside said desired dimensions to be light-absorbing opaque, wherein said passive layer is light-reflective.

19. The method according to claim 17, wherein said step of activating includes activating a portion of said active layer within said desired dimensions to be light-reflective opaque, wherein said passive layer is light-absorbing.

20. The method according to claim 17, wherein said step of activating includes activating a portion of said active layer outside said desired dimensions to be light-absorbing opaque, wherein said passive layer is light-transmissive.

21. The method according to claim 17, wherein said active layer includes a variable chromic material.

22. The method according to claim 17, further comprising:
receiving a signal indicative of said desired dimensions.

23. The method according to claim 22, wherein said signal is received as at least one of an infrared signal, an RF signal, an ultraviolet signal, a visible light signal and a wire signal.

24. A method of controlling a dynamic projection screen, comprising:
determining desired dimensions of a reflective region of a projection screen; and
causing at least one region of the projection screen to be activated so as to result in a reflective region having the desired dimensions, said reflective region being surrounded by a light-absorbing border region.

25. A method of controlling a dynamic projection screen, comprising:
determining desired dimensions of a transmissive region of a projection screen; and
causing at least one region of the projection screen to be activated so as to result in a transmissive region having the desired dimensions, said transmissive region being surrounded by a light-absorbing border region.

* * * * *